(12) United States Patent
Destefanis et al.

(10) Patent No.: US 12,067,540 B2
(45) Date of Patent: Aug. 20, 2024

(54) METHOD AND SYSTEM FOR SELECTIVELY USING NETWORK CODING FOR PROPAGATING TRANSACTIONS IN A BLOCKCHAIN NETWORK

(71) Applicant: nChain Licensing AG, Zug (CH)

(72) Inventors: Giuseppe Destefanis, London (GB); Simone Madeo, London (GB); Patrick Motylinski, London (GB); Stephane Vincent, Luxembourg (LU); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 462 days.

(21) Appl. No.: 16/620,864

(22) PCT Filed: Jun. 4, 2018

(86) PCT No.: PCT/IB2018/053978
§ 371 (c)(1),
(2) Date: Dec. 9, 2019

(87) PCT Pub. No.: WO2018/224942
PCT Pub. Date: Dec. 13, 2018

(65) Prior Publication Data
US 2020/0202312 A1    Jun. 25, 2020

(30) Foreign Application Priority Data

Jun. 9, 2017  (GB) ...................... 1709219

(51) Int. Cl.
*G06Q 20/08* (2012.01)
*H04B 7/155* (2006.01)
(Continued)

(52) U.S. Cl.
CPC ....... *G06Q 20/085* (2013.01); *H04B 7/15521* (2013.01); *H04L 1/0057* (2013.01);
(Continued)

(58) Field of Classification Search
CPC .............. G06Q 20/085; H04B 7/15521; H04B 1/0057; H04B 9/0637; H04B 47/11; H04B 47/38

See application file for complete search history.

(56) References Cited

U.S. PATENT DOCUMENTS 7,911,962 B2 * 3/2011 Khuu ..................... H04W 40/12
370/238
9,369,255 B2 * 6/2016 Medard ................. H04L 1/1854
(Continued)

FOREIGN PATENT DOCUMENTS

CN    101267450    * 9/2008 ............. H04L 29/08
CN    101409602 A    4/2009
(Continued)

OTHER PUBLICATIONS

Antonopoulos, "Mastering Bitcoin—Unlocking Digital Cryptocurrencies," O'Reilly Media, Inc., Dec. 20, 2014 (Year: 2014).*
(Continued)

*Primary Examiner* — Joseph A Bednash
(74) *Attorney, Agent, or Firm* — Davis Wright Tremaine LLP

(57) ABSTRACT

Methods and devices for propagating transactions in a network of nodes, each node having one or more connections to other nodes. The method includes determining that one of the nodes is a bottleneck for propagation of transactions; receiving, over a first time period, a plurality of new transactions from one or more first nodes in the network of nodes; combining the plurality of new transactions using network coding and a local encoding vector to generate a message; and sending the message and a global encoding vector to one or more second nodes in the network of nodes (Continued)

instead of sending the plurality of new transactions to the one or more second nodes. The network may be a blockchain network.

17 Claims, 7 Drawing Sheets

(51) Int. Cl.
    *H04L 1/00*         (2006.01)
    *H04L 9/06*         (2006.01)
    *H04L 47/11*       (2022.01)
    *H04L 47/38*       (2022.01)

(52) U.S. Cl.
    CPC ............ *H04L 9/0637* (2013.01); *H04L 47/11* (2013.01); *H04L 47/38* (2013.01)

(56) References Cited

U.S. PATENT DOCUMENTS

| | | | |
|---|---|---|---|
| 10,050,779 | B2 | 8/2018 | Alness et al. |
| 2006/0146791 | A1 | 7/2006 | Deb et al. |
| 2008/0075080 | A1 | 3/2008 | Katabi et al. |
| 2008/0225751 | A1* | 9/2008 | Kozat ................... H04W 40/12 370/254 |
| 2009/0135717 | A1 | 5/2009 | Kamal et al. |
| 2012/0327770 | A1 | 12/2012 | Vijayasankar et al. |
| 2013/0016629 | A1 | 1/2013 | Mallik et al. |
| 2013/0051324 | A1 | 2/2013 | Kim et al. |
| 2017/0126852 | A1 | 5/2017 | Narasimha |
| 2017/0127463 | A1 | 5/2017 | Narasimha |
| 2017/0127466 | A1 | 5/2017 | Narasimha |
| 2017/0364450 | A1* | 12/2017 | Struttmann ......... G06F 16/9024 |
| 2018/0188715 | A1* | 7/2018 | Cella ..................... G05B 11/32 |

FOREIGN PATENT DOCUMENTS

| | | | | |
|---|---|---|---|---|
| CN | 101635606 | A | | 1/2010 |
| CN | 101841479 | A | | 9/2010 |
| CN | 102208962 | A | | 10/2011 |
| CN | 103297174 | A | | 9/2013 |
| CN | 106603198 | A | | 4/2017 |
| EP | 3342063 | A1 | * | 7/2018 ......... H04B 7/15521 |
| JP | 2014112788 | A | | 6/2014 |
| WO | 2016022982 | A1 | | 2/2016 |
| WO | 2017112744 | A1 | | 6/2017 |

OTHER PUBLICATIONS

Chou et al., "Practical Network Coding", Proceedings of the 41st Annual Allerton Conference on Communication, Control, and Computing, Oct. 2003 (Year: 2003).*
Anandaraj et al., "An Efficient Framework for Large Scale Multimedia Content Distribution in P2P Network: I2NC," The Scientific World Journal, May 11, 2015 [revised Aug. 11, 2015] (Year: 2015).*
Chou et al., "Network Coding for the Internet and Wireless Networks", Microsoft Research, Jun. 2007 (Year: 2007).*
Anandaraj et al., "An Efficient Framework for Large Scale Multimedia Content Distribution in P2P Network: I2NC," The Scientific World Journal, http://dx.doi.org/10.1155/2015/30350, May 11, 2015 [revised Aug. 11, 2015], 13 pages.
Anonymous, "Development Update #81," Skycoin Blog, https://blog.skycoin.net/development-updates/development-update-81/, 9 pages.
Antonopoulos, "Mastering Bitcoin—Unlocking Digital Cryptocurrencies," O'Reilly Media, Inc., Dec. 20, 2014, 282 pages.
Cleju, et al., "Selection of Network Coding Nodes for Minimal Playback Delay in Streaming Overlays," Jan. 20, 2011, 12 pages.
International Search Report and Written Opinion mailed Sep. 17, 2018, Patent Application No. PCT/IB2018/053978, 13 pages.
Jafarisiavoshani et al., "Bottleneck Discovery and Overlay Management in Network Coded Peer-to-Peer Systems," Aug. 2007, 6 pages.
Lee et al., "Power Saving Mechanism with Network Coding in the Bottleneck Zone of Multimedia Sensor Networks," Elsevier Journal, Aug. 21, 2015, 11 pages.
Magli et al., "Network Coding Meets Multimedia: A Review," IEEE Transactions on Multimedia, Aug. 2013, 18 pages.
Nakamoto, "Bitcoin: A Peer-to-Peer Electronic Cash System," Bitcoin, Oct. 31, 2008, https://bitcoin.org/bitcoin.pdf, 9 pages.
Rout et al., "Enhancement of Lifetime Using Duty Cycle and Network Coding in Wireless Sensor Networks," IEEE Transactions on Wireless Communications, Feb. 2013, 12 pages.
Satoshi et al., "Connection Limits," Bitcoin Forum, Aug. 9, 2010, https:/bitcointalk.org/index.php?topic=741.0;prev_next=prev, 2 pages.
UK Commercial Search Report mailed Sep. 15, 2017, Patent Application No. GB510996, 7 pages.
UK IPO Search Report mailed Nov. 27, 2017, Patent Application No. GB1709219.8, 3 pages.
Wuille, "[Bitcoin-development] Removing Transaction Data From Blocks," May 8, 2015 [retrieved Sep. 9, 2017], https://lists.linuxfoundation.org/pipermail/bitcoin-dev/2015-May/008000.html, 2 pages.
Chou et al., "Network Coding for the Internet and Wireless Networks", Microsoft Research, Jun. 2007, 24 pages.
Huang et al., "Coded IP: on the Feasibility of IP-layer Network Coding", Conference: Proceedings of the 17th International Conference on Computer Communications and Networks, IEEE ICCCN Aug. 2008, 7 pages.
Takuya Inami, et al., "Consideration of Transport Layer Functions in Overlay Multicast Using Network Coding" Institute of Technology Aichi University of Education, Information Processing Society of Japan, the 71st National Convention, Mar. 10, 2009, 5 pages.
Japan Patent Office, "Notice of Reasons for Rejection", in Application No. 2023-029326, 12 pages.

* cited by examiner

METHOD AND SYSTEM FOR SELECTIVELY USING NETWORK CODING FOR PROPAGATING TRANSACTIONS IN A BLOCKCHAIN NETWORK

This invention relates generally to propagating messages and data in a network and more particularly to methods and devices to improve operation processing and transfer speed.

In this document we use the term 'blockchain' to include all forms of electronic, computer-based, distributed ledgers. These include, but are not limited to, consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions. Each transaction (Tx) is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

Network nodes that receive a new transaction will quickly try to push that transaction out to other nodes in the network. Before transmitting a new transaction to other nodes, it is "validated", meaning it is checked against a set of criteria to ensure the transaction meets the basic requirements for a proper transaction according to the applicable blockchain protocol.

In order for a transaction to be written to the blockchain, it is incorporated into a block by a node (a "miner" or "mining node") that is designed to collect transactions and form them into blocks. The miner then attempts to complete a "proof of work" with respect to the node. Miners throughout the blockchain network compete to be the first to assemble a block of transactions and complete the associated proof of work for that block. The successful miner adds its confirmed block to the blockchain and the block is propagated through the network so that other nodes that maintain a copy of the blockchain can update their records. Those nodes receiving a block also "validate" that block and all the transactions in it to ensure it complies with the formal requirements of the protocol.

It would be advantageous to enable or facilitate the use of widespread, cryptographically-secured exchanges using a blockchain-based network like Bitcoin. Such an exchange could relate to, for example, payment processing such as for credit card transactions. However, the transaction throughput of about 3 per second is insufficient for handling such electronic payments, which currently operate at a transactional volume of about 50,000 per second. One of the bottlenecks associated with speed of the blockchain network is propagation of transactions. Each node that receives a transaction validates the transaction and then send it to peer nodes. In fact, in the Bitcoin protocol, a node will send an INV message containing a list of transactions to a peer node and will receive a GETDATA response message selecting some subset of the transactions advertised in the INV message. The node then sends the requested transactions to the peer node. This process is carried out with respect to each peer node to which the node is connected.

Accordingly, it would be desirable to find a solution to the speed and scalability constraints that currently limit blockchain's ability to process high-volume transactions by improving the speed of transaction propagation. It would be desirable to find a solution more generally applicable to propagation of transactions in a network of nodes, whether related to blockchain or other applications.

Such a solution has now been devised.

Thus, in accordance with the present invention there are provided methods and devices as defined in the appended claims.

The present application describes and discloses methods and devices that enable fast propagation of transactions (TXs). In some examples, nodes selectively enable the use of network coding to combine transactions into a single message for sending to peer nodes. The selective use of network coding may be based on determining that the node is a potential bottleneck. The solution may be applied in the context of a blockchain network in some implementations. In propagating a set of new transactions, a node that has determined that it is a bottleneck may combine the new transactions using network coding and a local encoding vector to generate a message. The message is then sent to another node together with a global encoding vector.

In one aspect, the present application provides for the selective use of network coding as blockchain network conditions change to determine, dynamically, whether a node is a bottleneck and, as a result, whether network coding should be used. The nature of the blockchain network and the importance of speedy propagation of transactions to all nodes in the network may make universal network coding unnecessary and computationally costly, whereas the select use of network coding for nodes that are determined, at that point in time, to be a bottleneck, may provide speed advantages without the unnecessary complication and cost associated with a blanket usage of network coding for all node communications. The present application provides efficient and effective mechanisms for dynamically determining whether a node is bottleneck in the context of a blockchain network.

In an additional or alternative aspect, the present application describes a computer-implemented method to propagate transactions in a network of nodes, each node having one or more connections to other nodes. The method, implemented at one of the nodes, includes determining that the one of the nodes is a bottleneck for propagation of transactions; receiving, over a first time period, a plurality of new transactions from one or more first nodes in the network of nodes; combining the plurality of new transactions using network coding and a local encoding vector to generate a message; and sending the message and a global encoding vector to one or more second nodes in the network of nodes instead of sending the plurality of new transactions to the one or more second nodes.

In an additional or alternative aspect, the present application describes a node that includes a processor, memory, a network interface, and an application containing instructions that, when executed by the processor, perform one or more of the methods described herein.

In some implementations, the method or node determines that the node is a bottleneck by assessing a number of in-links to the node and a number of out-links from the node, and determining that the node is a bottleneck when the number of in-links exceeds the number of out-links. The assessment may occur at the time of receipt of a first transaction of the plurality of new transactions. In another implementation, the assessment may occur through tracking a count of in-links and a count of out-links over time, and wherein the number of in-links is an average and the number of out-links is an average. In some example implementations, the node initiates the determination that it is a bottleneck in response to receiving a first transaction of the plurality of new transactions.

In some implementations, the combining and sending is performed in response to determining that a stopping condition has been met. The stopping condition, in one example, expiry of a time duration since either receipt of a first of the plurality of new transactions or the determination that said one of the nodes is a bottleneck. In another example, the stopping condition is that the plurality of new transactions has reached a maximum number of new transactions.

In some implementations, the message has a length no longer than a longest transaction in the plurality of new transactions.

In an additional or alternative aspect, the present application describes a non-transitory processor-readable medium storing processor-executable instructions to propagate transactions within a network of nodes, wherein the processor-executable instructions, when executed by a processor in one of the nodes, cause the processor to carry out one or more of the methods described herein.

In many of the example implementations described herein, specific reference is made to blockchain transactions; however, it will be appreciated that the methods and devices described herein may be implemented and applied in connection with non-blockchain transaction propagation.

These and other aspects of the present invention will be apparent from and elucidated with reference to, the embodiment described herein. An embodiment of the present invention will now be described, by way of example only, and with reference to the accompanying drawings, in which:

FIG. 1 illustrates an example network associated with a blockchain.

FIG. 2 diagrammatically shows an example blockchain node with an input buffer and an output buffer.

Figure 5:
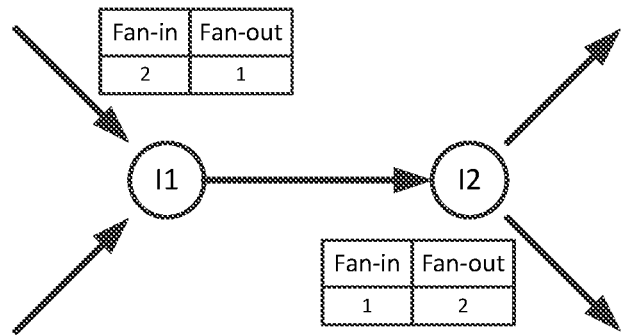

FIG. 5 diagrammatically shows a portion of an example blockchain network.

Figure 6:
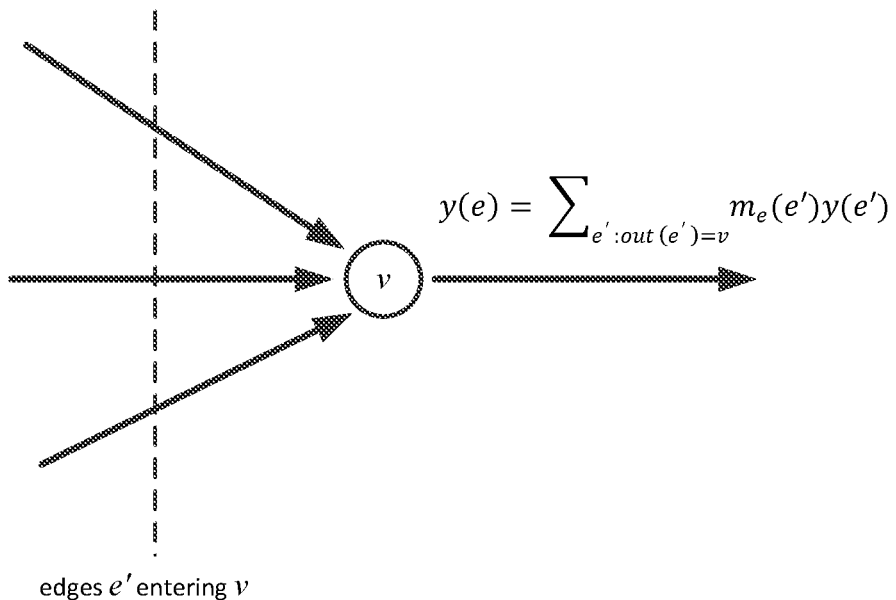

FIG. 6 illustrates a node with in-links and one out-link.

Figure 7:
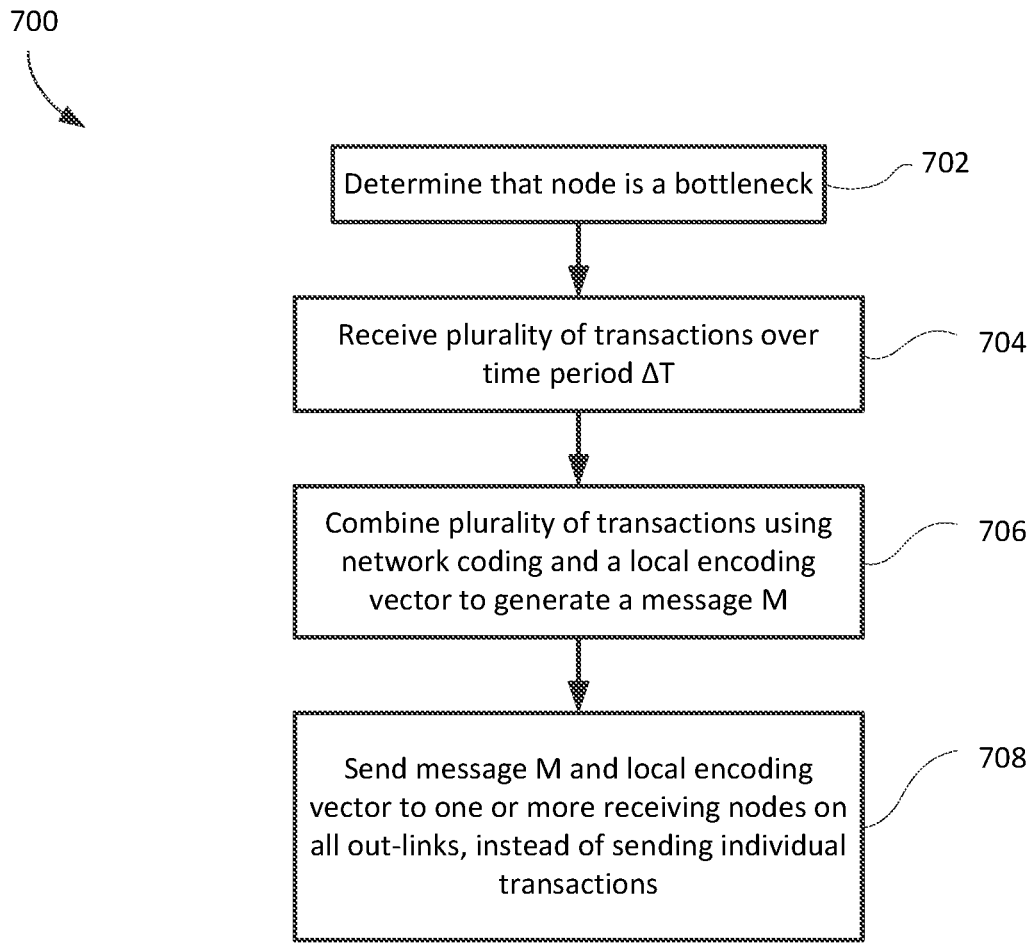

FIG. 7 shows, in flowchart form, an example process for propagating transactions in a blockchain network.

Figure 8:
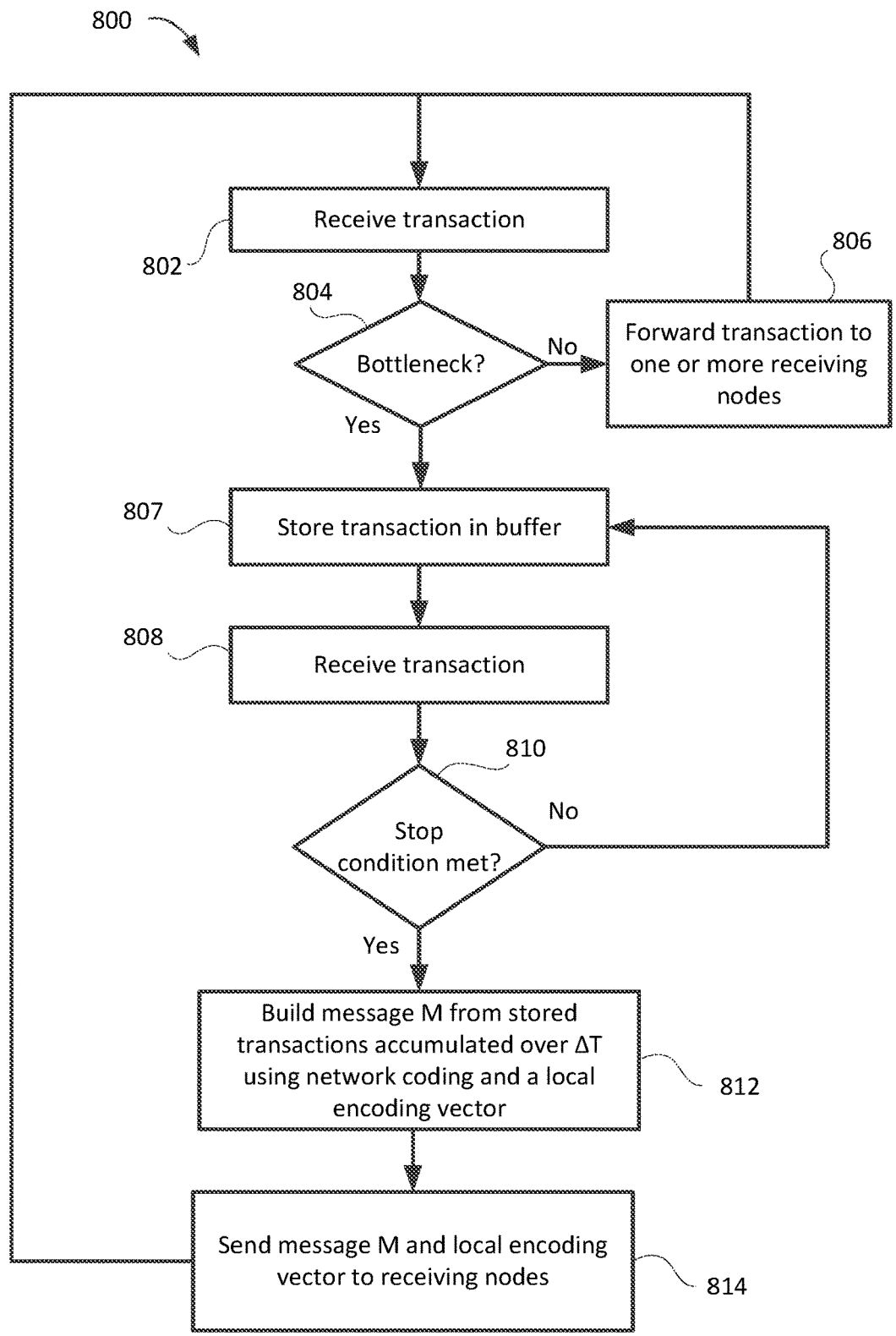

FIG. 8 shows, in flowchart form, another example process for propagating transactions in a blockchain network.

Figure 9:
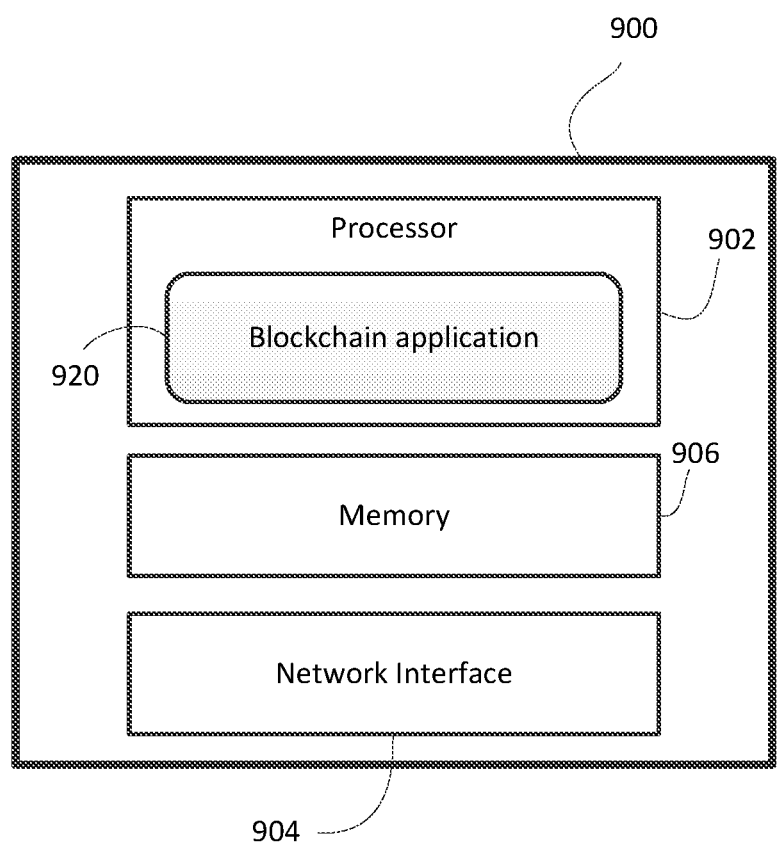

FIG. 9 shows, in block diagram form, an example blockchain node.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
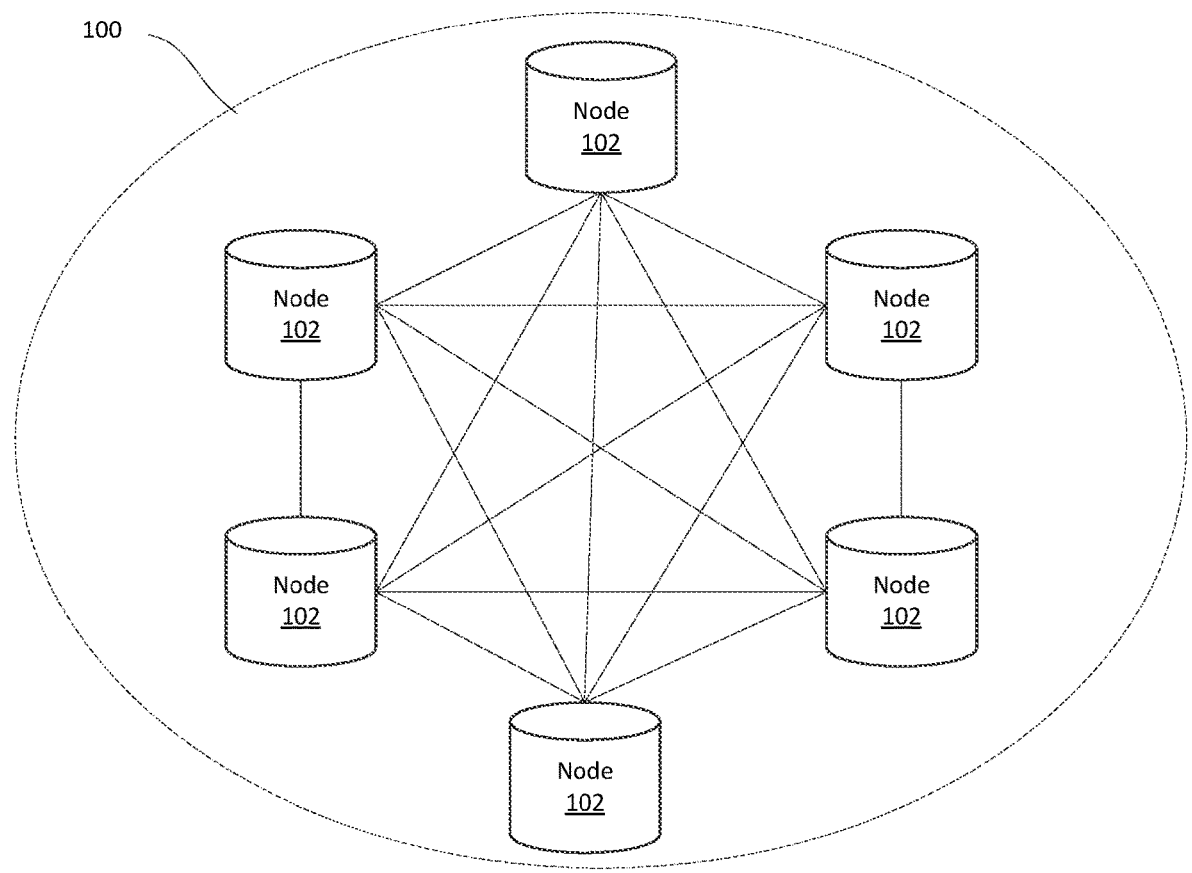

Reference will first be made to FIG. 1 which illustrates, in block diagram form, an example network associated with a blockchain, which may be referred to herein as a blockchain network 100. The blockchain network 100 is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, or other cryptocurrency, for example.

The electronic devices that run the blockchain protocol and that form the nodes 102 of the blockchain network 100 may be of various types including, for example, computers such as desktop computers, laptop computers, tablet computers, servers, mobile devices such a smartphones, wearable computers such as smart watches or other electronic devices.

Nodes 102 of the blockchain network 100 are coupled to one another using suitable communication technologies which may include wired and wireless communication technologies. In many cases, the blockchain network 100 is implemented at least partly over the Internet, and some of the nodes 102 may be located in geographically dispersed locations.

Nodes 102 maintain a global ledger of all transactions on the blockchain, grouped into blocks each of which contains a hash of the previous block in the chain. The global ledger is a distributed ledger and each node 102 may store a complete copy or a partial copy of the global ledger. Transactions by a node 102 affecting the global ledger are verified by other nodes 102 so that the validity of the global ledger is maintained. The details of implementing and operating a blockchain network, such as one using the Bitcoin protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction may be an address to which value is transferred as a result of the transaction. That value is then associated with that output address as an unspent transaction output (UTXO). A subsequent transaction may then reference that address as an input in order to spend or disperse that value.

Nodes 102 may be of different types or categories, depending on their functionality. It has been suggested that there are four basic functions associated with a node 102: wallet, mining, full blockchain maintenance, and network routing. There may be variations of these functions. Nodes 102 may have more than one of the functions. For example, a "full node" offers all four functions. A lightweight node, such as may be implemented in a digital wallet, for example, and may feature only wallet and network routing functions. Rather than storing the full blockchain, the digital wallet may keep track of block headers, which serve as indexes when querying blocks. Nodes 102 communicate with each other using a connection-oriented protocol, such as TCP/IP (Transmission Control Protocol).

In most blockchain networks, irrespective of the governing protocol, it is advantageous to ensure that new transactions are propagated quickly through the network so that all nodes that maintain a pool of unconfirmed transactions (typically called the "mempool") have an up-to-date and accurate database of transactions awaiting inclusion in a new block. Mining nodes draw on this pool of unconfirmed transactions to build potential new blocks. In some cases, the mining nodes maintain a full mempool locally so that they can assemble unconfirmed transactions into a new block for mining. In some embodiments, the mempool may be managed and maintained by a separate network of nodes (which may be called validator nodes, or the like) and those nodes may send a set of unconfirmed transactions from the mempool to the mining nodes to enable the mining nodes to attempt to mine a block. In some implementations, the mempool may be stored in a distributed hash table among a plurality of nodes. Irrespective of the structure, it is desirable that any new transaction be propagated through the network to reach the necessary nodes as soon as possible. It is also desirable that any new successfully mined blocks be propagated through the network as fast as possible so as to reduce the occurrence of orphan blocks.

In current implementations of the Bitcoin network, as an example, each node that receives a new transaction validates the transaction and then sends it to all of the nodes to which it is connected if those nodes have not already received the new transaction. In case of Bitcoin, the nodes use TCP/IP (Transmission Control Protocol). A node that receives a new transaction sends an INV message to each peer node with data regarding the available new transaction(s) and will receive back a GETDATA message from each node interested in receiving the new transaction(s). The node then sends, the transaction in a (separate) TCP message to each of the nodes that requested it.

Figure 2:
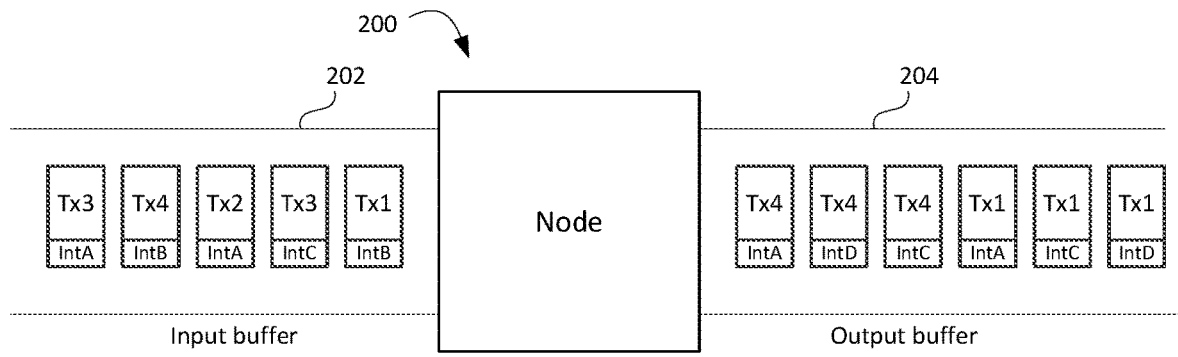

Reference is now made to FIG. 2, which diagrammatically shows an example node 200 with an input buffer 202 and an output buffer 204. The example node 200 has network interfaces with multiple peer nodes, referenced as intA, intB, intC, intD, etc. The input buffer 202 shows incoming transactions from the various peer nodes, and the output buffer 204 shows the transmission of certain received transactions to peer nodes over the respective interfaces. Network packets are serially sent and received at an application-level according to the primitives provided by the operating system of the node 200. Assuming that a transaction x fits in a single Ethernet/IP packet, its transmission to m peers requires the buffering of m different output packets. Both input and output network packets, along with other information, will contain a serialized transaction and a logical interface ID representing the TCP/IP connection to the sending/receiving peer.

The expected time for an incoming transaction to be processed depends on the average length (in packets) of the input queues $L_i$, while the expected time for a processed transaction to be correctly transmitted depends on the average length of the output queue $L_o$. Therefore, the efficient relay of transactions relies on the reduction of both $L_i$ and $L_o$ values. However, a probabilistic model for selective relay of the transactions to the peers directly affects $L_o$ and by induction also $L_i$.

In the current Bitcoin implementation, INV and GETDATA message packets are queued in the I/O buffers in the same way as transactions, with a severe impact on the transmission and reception delays.

There are proposals to use blockchain for higher-volume fast transactions. For example, consideration is being given to using blockchain for processing payments. Payment processing may include, for example, credit card transactions. The volume of such transactions would be overwhelming for current implementations of blockchain networks. It would therefore be advantageous to provide for methods and devices that improve a blockchain network's capacity to process communications, such as the sending of transactions between nodes.

In accordance with one aspect of the present application, a blockchain node buffers new transactions over a particular time period, and then uses network coding to combine the transactions into a single message that is then sent to one or more other blockchain nodes. That is a blockchain node encodes the new transactions to produce a message that mixes the new transactions in a way that can be unraveled, but that produces a combined message. The combined message has a size of the largest of the transactions plus a small overhead.

If the blockchain node uses network coding, then the node may also do away with relying on TCP/IP INV and GETDATA messages, since the node will send all new transactions in the form of the encoded message rather than having nodes pick-and-choose which subset of the new transactions they want to receive.

Figure 3:
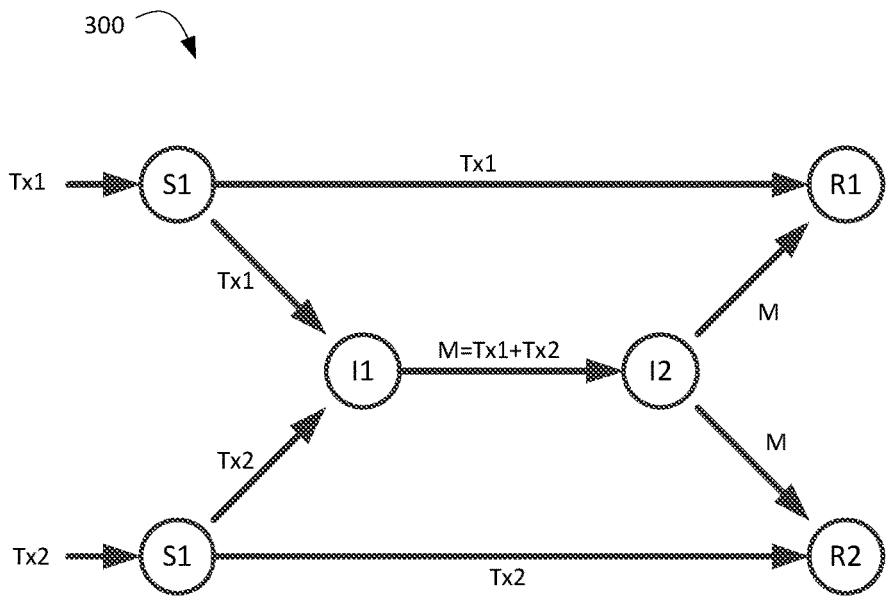
FIG. 3 shows a simplified example network of nodes in a blockchain network.

Reference is now made to FIG. 3, which shows a simplified example network of nodes in a blockchain network 300. Each node represents a network terminal (i.e., a blockchain node), while edges represent links between nodes. For the purposes of this illustration, it is supposed that for each link it is possible to send or receive a single bit at a time.

Two of the nodes are labelled as sources, S1 and S2, which receive two new transactions tx1 and tx2. In this example blockchain network 300, each node maintains a mempool of unconfirmed transactions so when a node receives a new transaction it is propagated through the network to all other nodes. Each node is to validate and store the new transactions in their respective local mempool and forward the new transactions to any peer nodes that to not yet have the new transactions. Due to the peer-to-peer nature of the blockchain network 300, all nodes do not receive a new transaction at the same time, meaning it will take some time for a new transaction to reach all nodes in the network 300. For example, in a current implementation of the Bitcoin network a new valid transaction will take an average of 3.5 seconds to reach the 90% of the nodes of the Bitcoin network. In theory, if the transmission of a transaction were immediate, e.g., t=0 for reaching all the nodes of the network, the network would be protected against possibilities of double spending attacks. Improving the throughput of a blockchain network is therefore a key element for allowing scalability and reliability of the whole system.

Two of the nodes of the blockchain network 300 are labelled as receivers, R1 and R2. Nodes I1 and I2 represent intermediate nodes which may, or may not, store a copy of the mempool, but more significantly represent a bottleneck for the network 300 at time T. When node I1 receives the two new transactions, Tx1 and Tx2, at approximately the same time it must decide which transaction to send first. That is, the outgoing edge from I1 to I2 is a bottleneck at least at time T.

Using network coding, the node I1 may combine the new transactions Tx1 and Tx2 into a composite message M that is the same size as the larger of Tx1 and Tx2. It sends message M to node I2, which then forwards message M to receivers R1 and R2. The receivers R1 and R2 are able to recover the individual transactions Tx1 and Tx2. For example, receiver R1 will receive Tx1 and M. Since M is based on a combination of Tx1 and Tx2, R1 only needs to solve the equations (Tx1, Tx1+Tx2) to elicit Tx2. On the contrary, R2 will receive Tx2 and need to solve the equations (Tx2, Tx1+Tx2) to elicit Tx1.

Bottlenecks can appear or disappear over time, depending on the configuration of the network and where transactions are generated at any given time. A bottleneck is a link (edge) between nodes which heavily limits the performance of the network and, specifically in the case of the blockchain network, slows down the transmission of transactions (or blocks). However, the source of a bottleneck (link between nodes) is a node.

Figure 4:
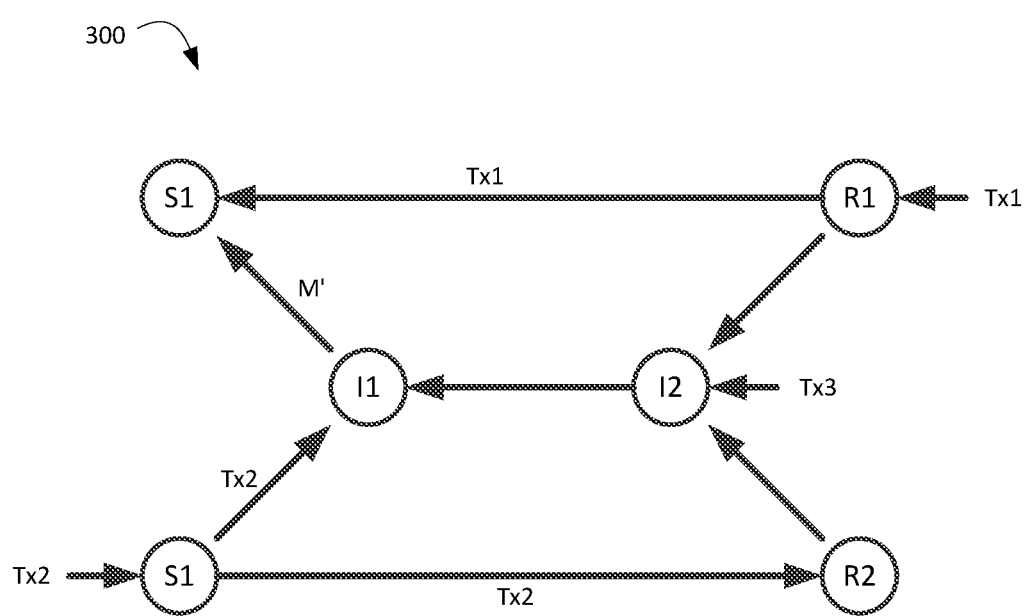
FIG. 4 shows the blockchain network of FIG. 3 at another time.

Reference is now made to FIG. 4, which shows the same blockchain network 300 at a time T'. In this example, transaction Tx1 is received at node R1 and transaction Tx3 is received at node I2. In this case, there is a bottleneck again at node I1, but this time with respect to the link between node I1 and node S1 due to the arrival at node I1 of both Tx2 and Tx3 at the same time. Using network coding, node I1 may combine Tx2 and Tx3 into a message M'.

One option is to have every node apply network coding in all situations. However, it may be possible to improve performance further by selectively applying network coding at particular nodes at which it might be expected to be advantageous at the time. As an example, if a node is able to determine whether it represents a bottleneck at any given point in time, then that node may selectively or adaptively apply network coding to the transmission of messages, whereas it may use regular transmission of transactions if it is not a bottleneck.

Accordingly, a node may be configured to evaluate or determine whether it is a likely bottleneck at a given point in time. In one sense this may be determined based on the balance between in-links and out-links. That is, at a given point in time, the node may receive transactions on one or more links and may intend to send those transactions out on one or more links. A connection (i.e. edge) between nodes may serve as an in-link or out-link at any given point in time depending on the flow of traffic in the network. The number of in-links may be referred to as "fan-in" and the number of out-links may be referred to as "fan-out" in some cases.

In one implementation, at least some of the nodes in a blockchain network maintain a table or other data structure tracking the relative number of fan-in and fan-out links to first-neighbour nodes. FIG. 5 diagrammatically shows a portion of an example network in which a first node I1 and a second node I2 each locally store a table or other data structure that, at any given time, identifies the fan-in and fan-out quantities for that node. On the basis of the relative fan-in and fan-out numbers a node may determine whether it is a likely bottleneck or not. In general, the determination may be based on whether the number of in-links (fan-in) exceeds the number of out-links (fan-out), in which case the node may be a bottleneck at that time.

In one example implementation, the assessment of whether a node is a bottleneck is over a period of time $\Delta T$. The quantities in the table may be an average fan-in and fan-out over the time period $\Delta T$.

The determination may also be partly based on awareness of network topology in some implementations. For example, a node that is a peripheral node is unlikely to be a bottleneck, whereas a node that is an intermediary node is more likely to be a bottleneck, at least on some occasions.

In yet other implementations, the determination of whether a node is a bottleneck may be based on the status of the output queue, or an assessment of backlog in the output queue over time.

The determination or identification of bottlenecks may, in some implementations, including a combination or sub-combination of the above factors.

Network coding was developed a little less than twenty years ago as an alternative to the dominant packet-switched networking of the time. Network coding models a network as a direct graph (N,L) with link capacities, demonstrating that a node $n \in N$ can communicate information to a set of receivers $R \subseteq N$ at a rate achieving the broadcast capacity h, with h being the value of the minimum cut between s and any $r \in R$ provided encoding at the interior nodes of the network.

A cut C is defined as a partition of the vertices V of a graph G=(V,E) into two disjoint subsets S and T. The cut-set of a cut C=(S,T) is the set $\{(u,v) \in E | u \in S, v \in T\}$ of edges that have one endpoint in S and the other endpoint in T.

An example methodology for network coding was described by P. A. Chou, Y. Wu, and K. Jain, "Practical Network Coding", in *Proceedings of the annual Allerton conference on communication control and computing*, v. 41, pp. 40-49, The University (2003) (hereinafter "Chou"), which is hereby incorporated by reference. This methodology removed the need for any centralized knowledge of the network topology or the encoding or decoding functions. Chou states that a network N can be represented as an acyclic graph G=(V,E) with unit capacity edges (e), a sender $s \in V$, and a certain number of receivers $T \subseteq E$. Each edge $e \in E$ output for a node v=in(e) has a symbol y(e) which is a linear combination of the symbol y(e') on the edges e' entering v. FIG. 6 illustrates the node v and the output y(e). In particular, the output is given by:

$$y(e) = \Sigma_{e':out(e')=v} m_e(e') y(e')$$

where $y(e'_i) = x_i$, i=1, ..., h, and the vector $m_e$ is the local encoding vector representing the encoding function at node v for the edge e, and h indicates the broadcast capacity as the minimum number of edges in any cut between the sender and receiver.

Chou states that the output y(e) on any edge $e \in E$ is a linear combination $y(e) = \Sigma_{i=1}^{h} g_i(e) x_i$ of the source symbols, and the h-dimensional vector of coefficients $g(e) = [g_1(e), \ldots, g_h(e)]$ can be recursively obtained by $g(e) = \Sigma_{e':out(e')} m_e(e') g(e')$, where $g(e'_i)$ on the edge $e'_i$ is initiated to the i-th unit vector. The vector g(e) may be called the global encoding vector along e. Any node t receiving along its h incoming edges the symbols:

$$\begin{bmatrix} y(e_1) \\ \vdots \\ y(e_h) \end{bmatrix} = \begin{bmatrix} g_1(e_1) & \cdots & g_h(e_1) \\ \vdots & \ddots & \vdots \\ g_1(e_h) & \cdots & g_h(e_h) \end{bmatrix} \begin{bmatrix} x_1 \\ \vdots \\ x_h \end{bmatrix} = G_t \begin{bmatrix} x_1 \\ \vdots \\ x_h \end{bmatrix}$$

can recover the source symbols $x_1, \ldots, x_h$ if the matrix $G_t$ of global encoding vectors has rank h. In this above example, as applied to blockchain transaction network coding, transactions are stored in the array $[x_1, \ldots, x_h]$. Further details are found in Chou.

The global encoding vector for an outgoing edge e may be characterized as being based upon the local encoding of global encoding vectors of incoming edges e'.

It will be appreciated that network coding may be used to propagate transactions through the network. It may also be used within an overlay network designed to implement a distributed hash table of unconfirmed transactions in which each transaction is stored by at least two nodes to ensure redundancy within the distributed hash table. In this case, network coding may be used in sending the transaction to the two or more nodes for storage. However, the use of network coding may provide the additional advantage of being able to recover from loss of two or more nodes storing a transaction. Because intermediary nodes have received one or more messages containing combined data relating to the transaction, the missing transaction could be recovered from the network coding messages.

Reference is now made to FIG. 7, which shows, in flowchart form, an example process 700 for propagating transactions in a blockchain network. The process 700 is implemented by a node of the blockchain network. A node may be understood, in this context, to refer to a mining node, full node, validator node, or other type of discrete blockchain node in the blockchain network. The node is a computing device with network connection(s), computing resources, and executing software implementing the blockchain protocol.

In operation 702, the node determines that it is a potential bottleneck in the network at time T. This determination, as discussed above, may be based on a fan-in and fan-out comparison at time T. For example, if fan-in exceeds fan-out at time T, then the node may determine that it is a bottleneck. Other factors may alternatively or additionally be taken into account in determining whether the node is a bottleneck. Examples include average fan-in and fan-out over a time period, node location in the network topology, the current or historical status of the node's output queue, or any other factors relating to node capacity for propagating received transactions.

In operation 704, having determined that it is a bottleneck, the node accumulates transactions over a time period $\Delta T$. The time period may be a predetermined length of time. In some example implementations, the time period may vary based on network traffic measurements, geographical information, or both. The time period is not a fixed time, but rather the accumulation of transactions may occur until a minimum number of transactions have been received, which may further be subject a maximum time so that the accumulated transactions are not held for too long.

In operation 706, the plurality of transaction that the node has accumulated are combined into a single message using network coding. The message may have a length as long as the longest of the transactions in some implementations. The message may have a length (in bits) no longer than the longest of the transactions in some implementations. The message is generated using a local encoding vector and a network coding algorithm.

The node then sends the message and a global encoding vector to one or more nodes in operation 708. The message is sent instead of sending the actual transactions. That is, the node does not send the plurality of accumulated transactions and, in their place, sends the message and the global encoding vector to peer nodes on all its out-links.

Reference will now be made to FIG. 8, which shows, in flowchart form, an example method 800 for propagating transactions in a blockchain network. As noted above, the method 800 may be implemented at a blockchain node having a plurality of in-links and out-links.

The blockchain node receives a transaction in operation 802. The received transaction is received via an in-link. The blockchain may validate the transaction against protocol requirements to ensure the transaction is legitimate. In operation 804, the node may determine whether it is a bottleneck with respect to the transaction. The determination may be based on an assessment of the balance between in-link (fan-in) and out-link (fan-out) at that time. The determination may be based on other factors, as discussed above.

If the node determines that it is not a bottleneck, then in operation 806 it forward the transaction to one or more peer nodes in the blockchain network on its out-links, as per normal. However, if the nodes determines that it is a likely bottleneck, the node stores the transaction in memory (for example, in a buffer or other memory element) in operation 807.

The node then continues to receive transactions, as indicated by operation 808, and store them until it determines that a stop condition has been met 810. In this example, the stop condition is that a time duration $\Delta T$ has elapsed. The time duration may run from the determination that the node is a bottleneck, or from receipt of the first transaction in operation 802, for example. Other conditions may be used instead of time duration, for example, accumulation of a maximum number of transactions in the memory, or any combination of such factors.

Once the stop condition is met, e.g. $\Delta T$ has elapsed in this case, the node then builds a message M from the stored transactions using network coding and a local encoding vector as indicated by operation 812. In operation 814, the node then sends this message and the global encoding vector to other nodes over all its out-links.

Reference will now be made to FIG. 9, which shows, in block diagram form, a simplified example of a participating node 900. The node 900 includes a processor 902, which may include one or more microprocessors, application specific integrated chips (ASICs), microcontrollers, or similar computer processing devices. The node 900 further includes memory 906, which may include persistent and non-persistent memory, to store values, variables, and in some instances processor-executable program instructions, and a network interface 904 to provide network connectivity over wired or wireless networks.

The node 900 includes a processor-executable blockchain application 920 containing processor-executable instructions that, when executed, cause the processor 902 to carry out one or more of the functions or operations described herein.

It will be understood that the devices and processes described herein and any module, routine, process, thread, application, or other software component implementing the described method/process for configuring the blockchain node may be realized using standard computer programming techniques and languages. The present application is not limited to particular processors, computer languages, computer programming conventions, data structures, or other such implementation details.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A node to propagate blockchain transactions in a network of nodes, each node in the network of nodes, having one or more connections to other nodes, the node comprising:
   a processor;
   memory;
   a network interface; and
   an application containing processor-executable instructions that, when executed by the processor, cause the processor to:
      determine that the node is a bottleneck for propagation of the blockchain transactions;
      receive, via the network interface and over a first time period, a plurality of new blockchain transactions from one or more first nodes in the network of nodes;
      combine the plurality of new blockchain transactions using network coding and a local encoding vector to generate a message, wherein the local encoding vector represents an encoding function at the node for a respective input to that node, and wherein the message has a length no longer than a longest blockchain transaction in the plurality of new blockchain transactions; and
      send the message and a global encoding vector to one or more second nodes in the network of nodes that do not yet have the plurality of new blockchain transactions instead of sending the plurality of new blockchain transactions to the one or more second nodes, wherein the global encoding vector represents an encoding function at a previous node for all inputs to that node.

2. The node claimed in claim 1, wherein the instructions, when executed, cause the processor to determine that said one of the nodes is the bottleneck by assessing a number of in-links to the node and a number of out-links from the node, and determining that said one of the nodes is the bottleneck when the number of in-links exceeds the number of out-links.

3. The node claimed in claim 2, wherein said assessing comprises assessing in response to a receipt of a first blockchain transaction of the plurality of new blockchain transactions.

4. The node claimed in claim 2, wherein said assessing comprises tracking a count of in-links and a count of out-links over time, and wherein the number of in-links is an average and the number of out-links is an average.

5. The node claimed in claim 1, wherein the instructions, when executed, cause the processor to initiate a determination that said one of the nodes is the bottleneck in response to receiving a first blockchain transaction of the plurality of new blockchain transactions.

6. The node claimed in claim 1, wherein the instructions, when executed, cause the processor to perform the combining and sending in response to determining that a stopping condition has been met.

7. The node claimed in claim 6, wherein the stopping condition comprises expiry of a time duration since either receipt of a first of the plurality of new blockchain transactions or a determination that said one of the nodes is the bottleneck.

8. The node claimed in claim 6, wherein the stopping condition comprises the plurality of new blockchain transactions reaching a maximum number of new blockchain transactions.

9. A computer-implemented method of propagating blockchain transactions in a network of nodes, each node in the network of nodes, having one or more connections to other nodes, the method, implemented at one of the nodes, including:
   determining that said one of the nodes is a bottleneck for propagation of the blockchain transactions;
   receiving, over a first time period, a plurality of new blockchain transactions from one or more first nodes in the network of nodes;
   combining the plurality of new blockchain transactions using network coding and a local encoding vector to generate a message, wherein the local encoding vector represents an encoding function at the node for a respective input to that node, and wherein the message has a length no longer than a longest blockchain transaction in the plurality of new blockchain transactions; and
   sending the message and a global encoding vector to one or more second nodes in the network of nodes that do not yet have the plurality of new blockchain transactions instead of sending the plurality of new blockchain transactions to the one or more second nodes, wherein the global encoding vector represents an encoding function at a previous node for all inputs to that node.

10. The method claimed in claim 9, wherein determining that said one of the nodes is the bottleneck comprises assessing a number of in-links to a node and a number of out-links from the nodes, and determining that said one of the nodes is the bottleneck when the number of in-links exceeds the number of out-links.

11. The method claimed in claim 10, wherein said assessing comprises assessing in response to a receipt of a first blockchain transaction of the plurality of new blockchain transactions.

12. The method claimed in claim 10, wherein said assessing comprises tracking a count of in-links and a count of out-links over time, and wherein the number of in-links is an average and the number of out-links is an average.

13. The method claimed in claim 9, wherein the determining that said one of the nodes is the bottleneck is initiated in response to receiving a first blockchain transaction of the plurality of new blockchain transactions.

14. The method claimed in claim 9, wherein the combining and sending occur in response to determining that a stopping condition has been met.

15. The method claimed in claim 14, wherein the stopping condition comprises expiry of a time duration since either receipt of a first of the plurality of new blockchain transactions and a determination that said one of the nodes is a bottleneck.

16. The method claimed in claim 14, wherein the stopping condition comprises the plurality of new blockchain transactions reaching a maximum number of new blockchain transactions.

17. A non-transitory processor-readable medium storing processor-executable instructions to participate in a blockchain transaction among a plurality of participating nodes, wherein the processor-executable instructions, when executed by a processor in one of a plurality of participating nodes, cause the processor to carry out the method claimed in claim 9.

* * * * *